US012567970B2

(12) United States Patent
Tuilier et al.

(10) Patent No.: US 12,567,970 B2
(45) Date of Patent: Mar. 3, 2026

(54) METHOD FOR MANAGING A ONE-TIME-PASSWORD

(71) Applicant: THALES DIS FRANCE SAS, Meudon (FR)

(72) Inventors: Edmond Tuilier, Marseilles (FR); Jean-Pierre Martin, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 283 days.

(21) Appl. No.: 18/258,234

(22) PCT Filed: Dec. 15, 2021

(86) PCT No.: PCT/EP2021/085898
§ 371 (c)(1),
(2) Date: Jun. 19, 2023

(87) PCT Pub. No.: WO2022/148617
PCT Pub. Date: Jul. 14, 2022

(65) Prior Publication Data
US 2024/0056305 A1 Feb. 15, 2024

(30) Foreign Application Priority Data
Jan. 5, 2021 (EP) ..................................... 21305006

(51) Int. Cl.
*H04L 9/32* (2006.01)
*G06F 21/32* (2013.01)
(Continued)

(52) U.S. Cl.
CPC ............ *H04L 9/3234* (2013.01); *G06F 21/32* (2013.01); *G06F 21/34* (2013.01); *H04L 9/3228* (2013.01);
(Continued)

(58) Field of Classification Search
CPC ... H04L 9/3234; H04L 9/3228; H04L 9/3231; H04L 63/0853; H04L 63/0838; H04L 63/0861; G06F 21/34; G06F 21/32
See application file for complete search history.

(56) References Cited

U.S. PATENT DOCUMENTS 7,475,812 B1 * 1/2009 Novozhenets ........... G07C 9/21
235/382
11,323,261 B1 * 5/2022 Jibrin ................. G06V 40/1382
(Continued)

FOREIGN PATENT DOCUMENTS

EP 3288214 A1 2/2018

OTHER PUBLICATIONS

Khalid, H.; Hashim, S.J.; Ahmad, S. M.S.; Hashim, F.; Chaudary, M.A.; "New and Simple Offline Authentication Approach using Time-based One-time Password with Biometric for Car Sharing Vehicles," IEEE Asia-Pacific Conf on Computer Science and Data Engineering (CSDE), Gold Coast, Australia, Dec. 16-18, 2020, 7 pages.*

(Continued)

*Primary Examiner* — Victor Lesniewski

(57) ABSTRACT

Provided is a method for providing a One-Time-Password by an OTP device that when configured establishes a communication session between the OTP device and a card embedding a biometric sensor, sends to the card, a request to get a cryptographic value computed from an identifier of the card, tries to authenticate a user through said biometric sensor and automatically releasing the cryptographic value in case of success only, sends the cryptographic value from the card to the OTP device, checks, by the OTP device, the cryptographic value by using a reference value, and provides the One-Time-Password by the OTP device only in case of success. Other embodiments disclosed.

15 Claims, 4 Drawing Sheets

(51) Int. Cl.
G06F 21/34 (2013.01)
H04L 9/40 (2022.01)

(52) U.S. Cl.
CPC ........ H04L 9/3231 (2013.01); H04L 63/0838 (2013.01); H04L 63/0853 (2013.01); H04L 63/0861 (2013.01)

(56) References Cited

U.S. PATENT DOCUMENTS

| | | | | |
|---|---|---|---|---|
| 2006/0213982 | A1* | 9/2006 | Cannon | G06K 7/0013 |
| | | | | 235/380 |
| 2007/0240198 | A1* | 10/2007 | Kander | H04L 63/0853 |
| | | | | 726/2 |
| 2009/0119759 | A1* | 5/2009 | Taugbol | H04L 63/0853 |
| | | | | 726/6 |
| 2011/0107095 | A1* | 5/2011 | Malzahn | G06F 21/34 |
| | | | | 713/168 |
| 2012/0054842 | A1* | 3/2012 | Urios Rodriguez | G06Q 20/40 |
| | | | | 726/6 |
| 2013/0046693 | A1* | 2/2013 | Ayedun | G06Q 20/40 |
| | | | | 705/44 |
| 2014/0337957 | A1 | 11/2014 | Feekes | |
| 2016/0156619 | A1* | 6/2016 | Lovelock | H04L 9/3234 |
| | | | | 726/7 |
| 2017/0279795 | A1* | 9/2017 | Redberg | H04L 63/0861 |
| 2019/0245848 | A1* | 8/2019 | Divoux | H04L 63/0815 |
| 2020/0137052 | A1* | 4/2020 | Sunkavally | H04L 63/0838 |
| 2020/0145408 | A1* | 5/2020 | Komperla | H04L 9/3231 |
| 2023/0046056 | A1* | 2/2023 | Skårbratt | G06V 40/13 |

OTHER PUBLICATIONS

Soares, Joyce; Gaikwad, A.N.; "Fingerprint and iris biometric controlled smart banking machine embedded with GSM technology for OTP," International Conference on Automatic Control and Dynamic Optimization Techniques (ICACDOT), Pune, India, Sep. 9-10, 2016, IEEE, pp. 409-414.*

Yahaya, Y.H.; Isa, M.R.M.; Aziz, M.I.; "Fingerprint Biometrics Authentication on Smart Card," Second International Conference on Computer and Electrical Engineering, Dubai, United Arab Emirates, Dec. 28-30, 2009, IEEE, pp. 671-673.*

International Search Report (PCT/ISA/210) and Written Opinion (PCT/ISA/237) mailed on March Feb. 11, 2022, by the European Patent Office as the International Searching Authority for current International Application No. PCT/EP2021/085898—[12 pages].

* cited by examiner

METHOD FOR MANAGING A ONE-TIME-PASSWORD

FIELD

The present invention relates to methods for managing a one-time-password (OTP). It relates particularly to methods of providing One-Time-Passwords by OTP hardware devices.

BACKGROUND

OTPs are passwords which are valid only once. OTPs typically rely on complex calculation. At least two types of OTPs are widely used. The first type uses a mathematical algorithm to generate each new password based on a counter. Another implementation type is based on time-synchronization between the authentication server (OTP server) and the client generating the one-time-password (OTP client). In such a case, the OTP is valid during a preset time window only. It is also possible to mix both types, i.e. to derive the next password from a counter and from the current time (and possibly other parameters). OTPs have a number of constraints (such as synchronization between the OTP server and the OTP client), which are now well understood by those skilled in the art.

The OTP client may be embedded in a portable hardware device able to display or send the generated OTP. Such an OTP device may be in the form of a small device having a battery and at least one button. When such an OTP device is lost or stolen, a malevolent person may trigger the generation of a new OTP and used it for undue operation. Protecting access to the OTP client is important order to guarantee that only a genuine user is able to get a new one-time-password.

There is need to solve the above-presented problem.

The invention aims at solving the above mentioned technical problem.

An object of the present invention is a method for providing a One-Time-Password by an OTP device. The method comprises the following steps:

Establishing a communication session between the OTP device and a smart card that embeds a biometric sensor.

Sending, from the OTP device to the smart card, a request to get a cryptographic value computed from an identifier of the smart card.

Trying to authenticate a user by using said biometric sensor and automatically releasing the cryptographic value only if the user was successfully authenticated.

Sending the cryptographic value from the smart card to the OTP device.

Performing by the OTP device a verification of the received cryptographic value by using a reference value, and Providing the One-Time-Password by the OTP device only if said verification was successful.

Advantageously, the method may comprise the following steps before sending the request to get the cryptographic value:

Sending, from the OTP device to the smart card, a command to get the identifier, Receiving by the OTP device the identifier sent by the smart card in response to said command.

Advantageously, the method may comprise the step of checking by the OTP device that the identifier received in response to the command matches a preregistered identity data and sending the request to get the cryptographic value only in case of successful checking.

Advantageously, the method may comprise the previously executed steps:

Receiving by the OTP device a challenge originated from a server,

Generating a result by assessing a security rule depending on the challenge and triggering the sending of the request only if said result reflects that provision of the One-Time-Password is conditioned by a biometric authentication of the user.

Advantageously, the method may comprise the previously executed steps:

Sending, from the OTP device to the smart card, a binding request to get the reference value, Trying to authenticate the user by using the biometric sensor and automatically sending the reference value by the smart card only if the user was successfully authenticated, Storing the reference value by the OTP device.

Advantageously, the identifier may be a serial number of the smart card.

Another object of the present invention is an OTP device which comprises a communication interface configured to exchange data with a smart card. The OTP device is configured to send to the smart card a request to get a cryptographic value computed from an identifier of the smart card. Upon receipt of the cryptographic value, the OTP device is configured to perform a verification of the cryptographic value by using a reference value. The OTP device is configured to provide the One-Time-Password only if said verification was successful.

Advantageously, the OTP device may be configured to retrieve the identifier of the smart card by sending to the smart card a command to get the identifier of the smart card before sending the request to get the cryptographic value.

Advantageously, the OTP device may be configured to check that the identifier received in response to said command matches a preregistered identity data and to send the request to get the cryptographic value only in case of successful checking.

Advantageously, the OTP device may be configured to check that the identifier received in response to said command complies with a predefined rule and to send the request to get the cryptographic value only in case of successful checking.

Advantageously, the OTP device may be configured to generate a result by assessing a security rule and to trigger the sending of the request only if said result reflects that provision of the One-Time-Password is conditioned by a biometric authentication of the user.

Advantageously, the OTP device may be configured to receive a challenge originated from a server, and the security rule may depend on the challenge.

Advantageously, the OTP device may be configured to generate the One-Time-Password by signing the challenge with a key preregistered in the OTP device.

Advantageously, the OTP device may be configured to display the One-Time-Password or to send the One-Time-Password to a remote apparatus.

Another object of the present invention is a system comprising a smart card and an OTP device according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

The invention may apply to any type of device intended to provide One-Time-Passwords. For instance the OTP device may be a portable apparatus or a key fob embedding an OTP client. The OTP device may generate an OTP on-the-fly each time a request occurs or pre-generate one or several OTPs and provision an OTP each time a request occurs.

Figure 1:
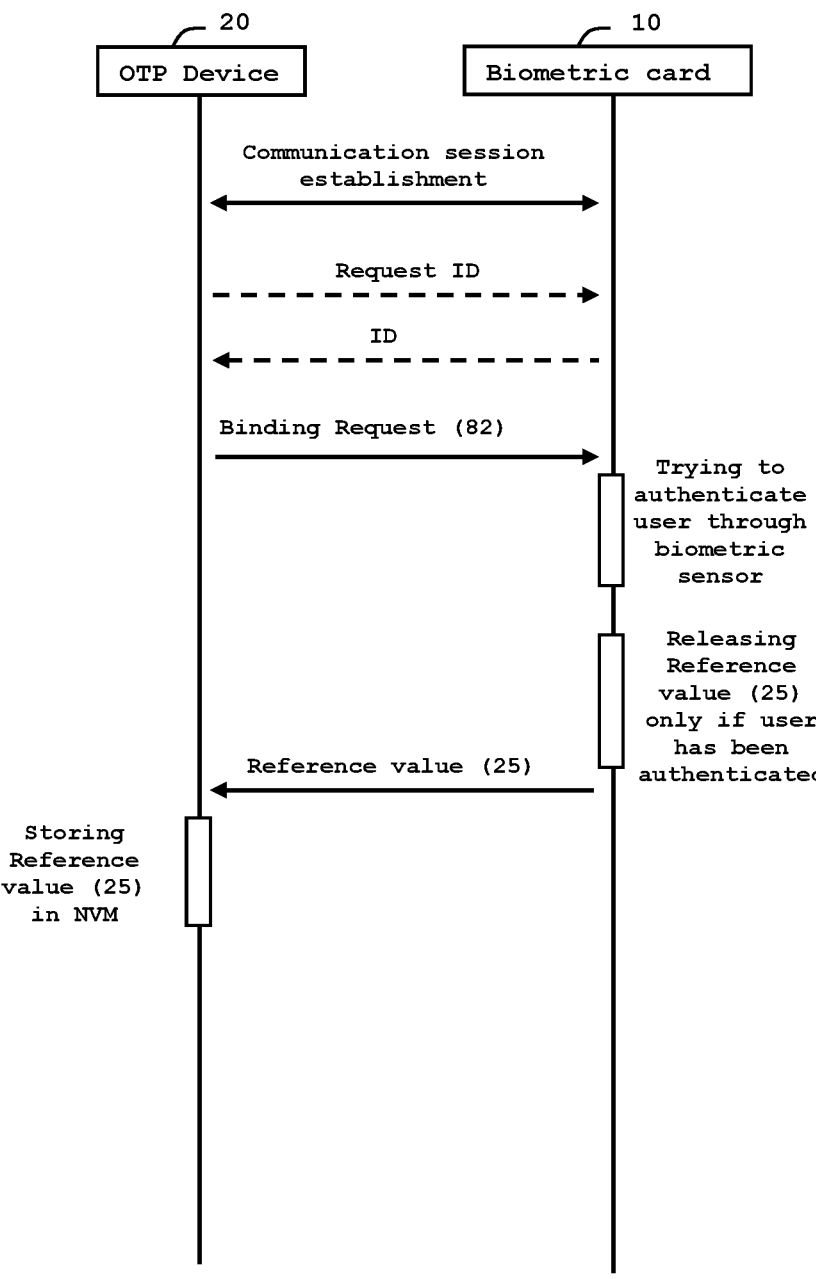
FIG. 1 shows an exemplary flow diagram to bind an OTP device and a biometric card according to an embodiment of the invention.

FIG. 1 shows an exemplary flow diagram to carry out a binding phase between an OTP device and a biometric card according to an embodiment of the invention.

In this example, the OTP device 20 may be a portable hardware device including a display, a battery, a real time clock (RTC) and a button to request provision of a new OTP. The OTP device comprises a communication interface configured to exchange data with a smart card. The communication interface may be a designed to exchanged data in contact mode or wireless mode. For instance, the communication interface may be compliant with ISO/IEC7816-3 T=0 or T=1 protocols for contact mode or with ISO/IEC14443, ISO/IEC21481 or ISO/IEC18092 standards for contactless mode.

Smart cards are portable small devices comprising a memory, a microprocessor and an operating system for computing treatments. They may comprise services applications like payment applications. Such secure elements may comprise a plurality of memories of different types, like non-volatile memory and volatile memory. They are considered as tamper-resistant (or "secure") because they are able to control the access to the data they contain and to authorize or not the use of data by other machines. A smartcard may also provide computation services based on cryptographic components. In general, smartcards have limited computing resources and limited memory resources and they are intended to connect a host machine which provides them with electric power either in contact mode or contactless mode.

A biometric smart card contains at least one biometric sensor, like a fingerprint sensor, which can contribute to the authentication of the user of the smartcard.

In the example of FIG. 1, the biometric smartcard 10 embeds a secure element (chip) comprising a hardware processing unit, memory and an operating system designed to contribute to bank services. The biometric card also comprises a reference biometric data which has been enrolled by the genuine user (i.e. bank customer). The biometric card 10 may use the reference biometric data to authenticate the cardholder by using a biometric data captured by its sensor.

At a first step, the OTP device 20 and the biometric card 10 establish a communication channel (i.e. a communication session is open).

At a second step, the OTP device 20 may request an identifier of the card by sending a specific command (Request ID or read Identifier).

At a third step, the OTP device 20 receives the identifier 19 of the card through the communication channel. The OTP device may store in its own memory the received card identifier as an identity data 27. The stored identity data 27 may be used in further phases to check that the card has been registered by the OTP device.

It is to be noted that second and third steps are optional. The OTP device 20 may get the card identifier 19 by another way. For instance, the card identifier may be prerecorded in the OTP device 20 or may be provided by the cardholder through a man-machine interface like a keyboard or via another machine like a computer coupled to the OTP device.

The card identifier is assumed to be uniquely assigned to the card 10. It may be a serial number of the card or a random value generated by the card. The card identifier may be a physical unclonable function (PUF) of the card computed from the chip, the memory component or any hardware component embedded in the card 10. The card identifier may also be a value (preferably random) provided to the card by the OTP device.

At a fourth step, the OTP device 20 sends to the card 10 a binding request 82 to retrieve a reference value from the smart card 10.

In some embodiments, the binding request 82 may comprise the card identifier 19.

In some embodiments, the OTP device 20 may not manage the card identifier 19 (and may not store the identity data 27) and the binding request 82 may be devoid of the card identifier 19.

At a fifth step, upon receipt of the binding request, the card tries to authenticate the user via its biometric sensor. For convenience, the card (and/or the OTP device) may light up a led or provide another signal to guide the user. The authentication of the user (cardholder) is performed by way of comparison based on both the stored reference biometric data and the biometric data captured by the sensor.

At a sixth step, the card identifies a reference value 25 and automatically sends (to the OTP device) the reference value 25 only if the user has been authenticated through the captured biometric data.

In some embodiments, the card may generate the reference value 25 as the signature of the card identifier. Such a signature may be computed by using a pre-stored key or a key generated by the card itself.

In some embodiments, the card may generate the reference value 25 as the hash of the card identifier.

In some embodiments, the card may generate the reference value 25 as the result of a cryptographic function which takes the card identifier as input parameter.

At a seventh step, the OTP device 20 stores the received reference value 25 in its own non-volatile memory (NVM). In a preferred embodiment, the OTP device 20 may associate the reference value 25 with the card identifier.

In some embodiments, the card may send a message reflecting the failure of the user authentication in response to the binding request.

Figure 2:
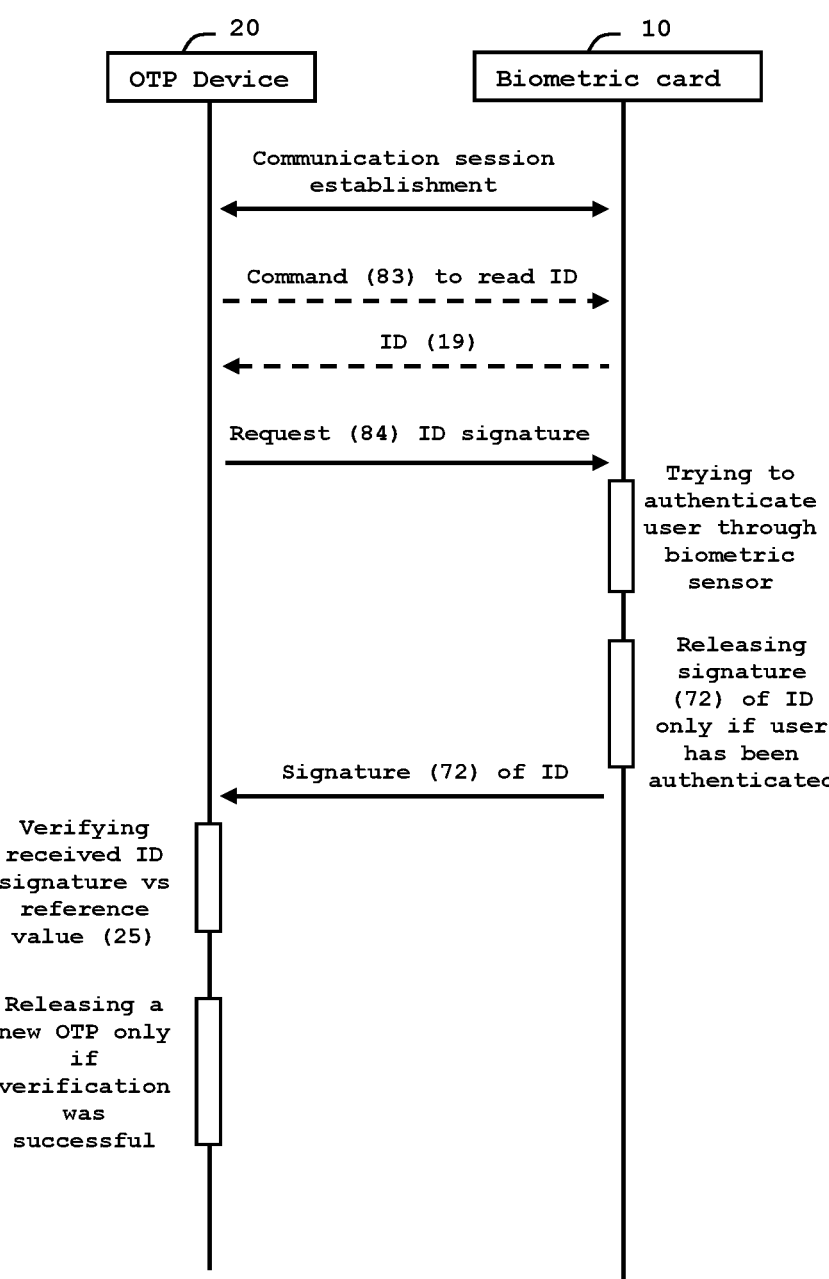
FIG. 2 shows a first exemplary flow diagram to trigger the provision of an OTP according to an embodiment of the invention.

FIG. 2 shows a first exemplary flow diagram to trigger the provision of an OTP according to an embodiment of the invention.

In this example, the OTP device 20 is assumed to have been provisioned with the reference value 25 (and possibly the card identifier 19) according to the method of FIG. 1.

Alternatively, the OTP device 20 may get the reference value 25 (and possibly the card identifier 19) by another way. For instance, the reference value 25 may be prerecorded in the OTP device 20 during a personalization phase or may be provided by another apparatus like a computer coupled to the OTP device.

At a first step, the OTP device 20 and the biometric card 10 establish a communication session (i.e. a communication channel is open). For example, upon detection of card insertion, the OTP device may initiate establishment of the communication channel.

At a second step, the OTP device 20 may send a command 83 to get the card identifier 19. For instance, the command may be a command aiming at reading a specific field in the card memory.

At a third step, the OTP device 20 receives the identifier of the card in response to the command 83 through the communication channel.

It is to be noted that second and third steps are optional. The OTP device 20 may have access to the card identifier by another way. For instance, the card identifier may be stored in the OTP device 20 during a previous stage or may be provided by the cardholder through a man-machine interface like a keyboard or via another machine like a computer coupled to the OTP device.

In some embodiments, the OTP device 20 may not access the card identifier.

At a fourth step, the OTP device 20 sends to the card 10 a request 84 to get a cryptographic value 72. In some embodiments, the request may contain the card identifier 19 and the card may be assumed to generate the cryptographic value 72 by applying a cryptographic function to the received card identifier 19.

In some embodiments, the request may not contain the card identifier 19 and the card may be assumed to retrieve the card identifier 19 from its own memory to use it as input parameter for generating the cryptographic value 72.

At a fifth step, the card tries to authenticate the user via its biometric sensor. The receipt of the request 84 triggers starting of the capture of a biometric data by the sensor of the card. User authentication is performed by way of comparison based on both the stored reference biometric data and a biometric data captured by the biometric sensor.

At a sixth step, the card identifies a cryptographic value 72 and automatically sends it to the OTP device only if the user has been authenticated through the captured biometric data. Preferably, the card generates the cryptographic value 72 in the same way it generated the reference value 25.

At a seventh step, the OTP device 20 performs a verification of the received cryptographic value 72 by using the stored reference value 25. The verification may be based on a comparison or a more complex mathematical treatment.

At an eighth step, the OTP device 20 provides a new One-Time-Password only if the verification succeeded at seventh step. The OTP device 20 may generate the new OTP as soon as the verification succeeded or may retrieve a pre-computed OTP from its memory.

In some embodiments, the OTP device 20 may use the card identifier 19 received in response to the command 83 to check that the card 10 has been duly pre-enrolled by the OTP device. In particular, the OTP device may check that the identifier 19 received in response to the command 83 matches the preregistered identity data 27 and send the request 84 to get the cryptographic value 72 only in case of successful checking.

Figure 3:
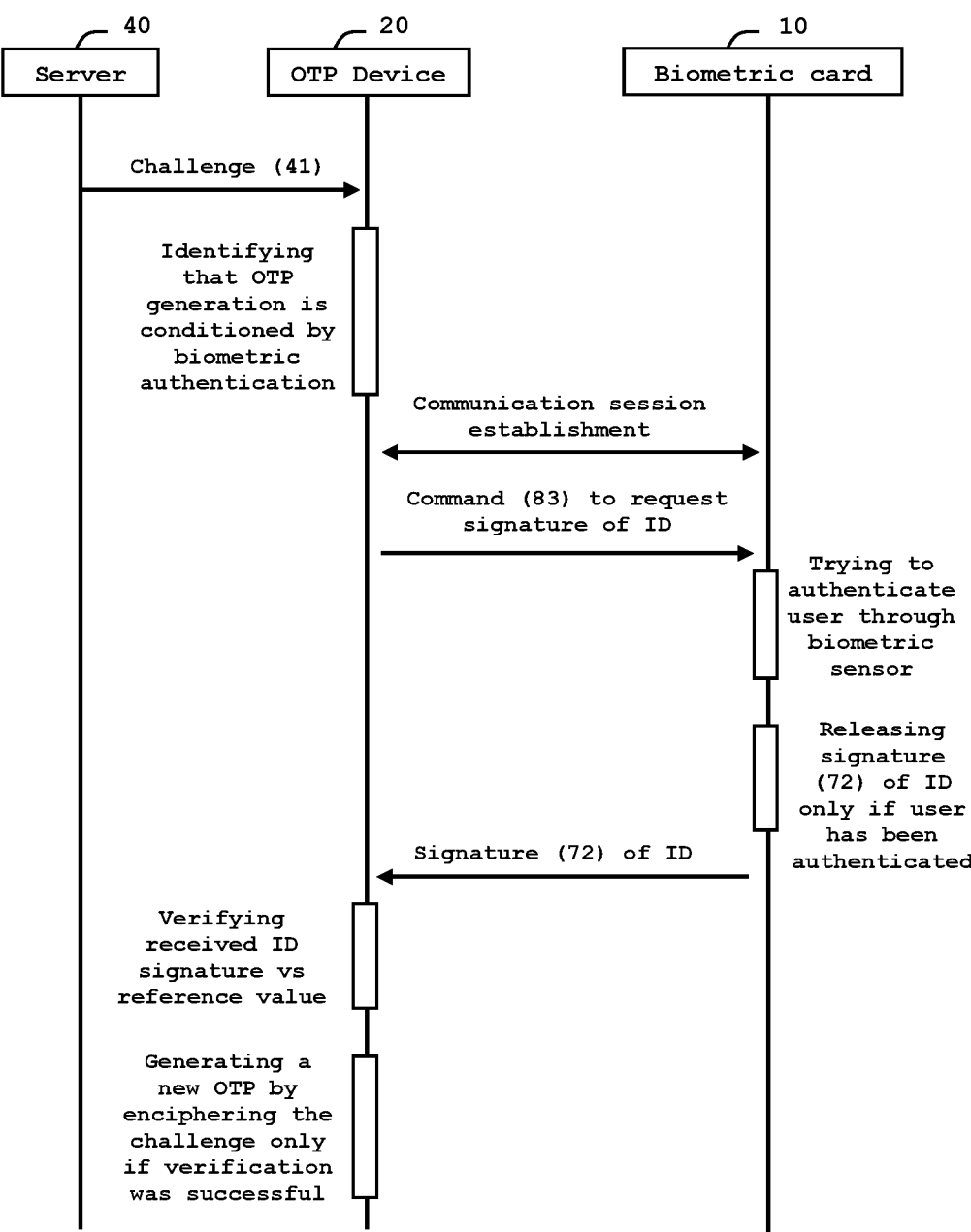
FIG. 3 shows a second exemplary flow diagram to trigger the provision of an OTP according to an embodiment of the invention.

FIG. 3 shows a second exemplary flow diagram to trigger the provision of an OTP according to an embodiment of the invention.

In this example, the OTP device 20 is assumed to have been provisioned with the reference value 25 (and possibly the card identifier 19) according to the method of FIG. 1.

The OTP device is connected to a server 40 which may be hosted in a local computer or a remote computer reachable through any relevant network. The server may be a hardware machine.

At a first step, the OTP device receives a challenge 41 originated from the server 40. The challenge may be a random value generated by the server.

At a second step, the OTP device generates a result by assessing a security rule depending on the challenge.

Then the OTP device triggers the sending of the request 84 to get a cryptographic value 72 only if the result reflects that provision of the One-Time-Password is conditioned by a biometric authentication of the user. The security rule may be pre-stored in the OTP device or received from the server with the challenge. The security rule may allow to dynamically adapt the security level requirements according to the conditions, context or parameters of a transaction. For instance, provision of OTP may depends on biometric user authentication for payment transactions for an amount above a predefined threshold.

Then the flow continues in a manner similar to the sequence described at FIG. 2.

The OTP device 20 may generate the one-time-password by signing the challenge 41 using a key pre-stored in the OTP device.

Figure 4:
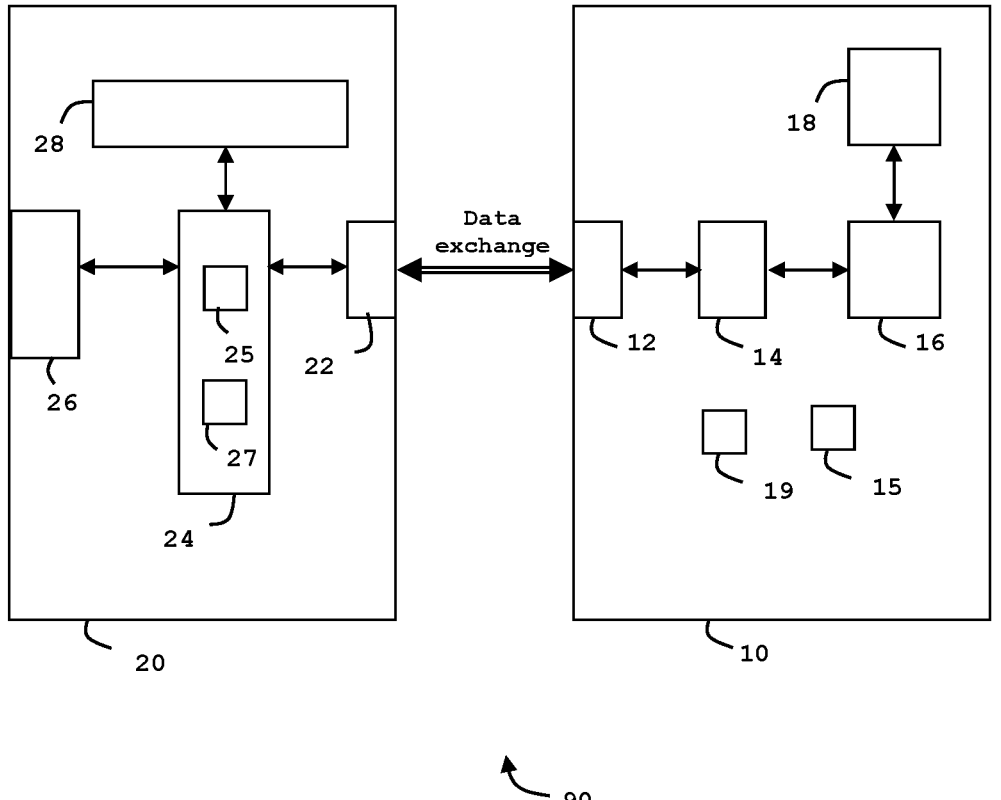
FIG. 4 shows a diagram of architecture of a system comprising an OTP device and a biometric card according to an embodiment of the invention.

FIG. 4 depicts a diagram of architecture of a system comprising an OTP device and a biometric card according to an embodiment of the invention.

The system 90 comprises an OTP device 20 and a biometric smart card 10.

The OTP device comprises a communication interface 22 which is configured to exchange data with the smart card 10. The communication interface 22 may be configured to communicate with the card in contact mode according to the protocols defined by ISO/IEC 7816 or USB for instance. It may be configured to communicate with the card in contactless mode according to a protocol complying with ISO/IEC 14443, Mifare®, Felica®, ISO/IEC 15693 or NFC Forum Tag specifications for instance.

The OTP device is configured to send to the card 10 a request 84 to get a cryptographic value 72 computed from an identifier of the smart card 10.

The OTP device is configured to perform a verification of the received cryptographic value 72 by using a reference value 25 stored in its memory upon receipt of the cryptographic value 72.

The OTP device is configured to provide the One-Time-Password only if the verification was successful.

The OTP device comprises an OTP generator 24 able to compute new OTPs. The OTP generator 24 may be able to store a series of generated OTPs and to retrieve one element of the series when an OTP is to be provisioned.

The OTP generator 24 may comprise a RTC. The OTP generator 24 may store the reference value 25 bound to the card 10. The OTP generator 24 may store a preregistered identity data 27 assigned to the card 10.

Preferably, the OTP device comprises a battery.

In some embodiments, the OTP device may comprise a screen 28 to display the One-Time-Passwords.

In some embodiments, the OTP device may comprise a communication interface 26 to exchange data with a server as illustrated at FIG. 3. The communication interface 26 may be adapted to exchange data according to any relevant wireless bearer like NFC, Wi-Fi, Bluetooth® or BLE for instance) or through a wired link. The communication channel between the OTP device 20 and the remote server 40 may be based on any combination comprising a telecom network, the Internet or a private network for instance.

The OTP device may be configured to retrieve the identifier of the connected smart card by sending to the smart card a command 83 to get the card identifier before sending the request 84 to get a cryptographic value 72.

The OTP device may be configured to check that the identifier received in response to the command 83 matches a preregistered identity data 27 and to send the request 84 to get a cryptographic value 72 only in case of successful checking.

The OTP device may be configured to check that the identifier received in response to the command 83 complies with a predefined rule and to send the request 84 only in case of successful checking. For instance, the predefined rule may specify that the identifier belongs to a specific range, reflects a specific card type or comply with a specific format.

The OTP device may be configured to generate a result by assessing a security rule and to trigger the sending of the request 84 only if the result reflects that provision of the One-Time-Password is conditioned by a biometric authentication of the user. The security rule may be pre-stored in the OTP device during a personalization phase.

The OTP device may be configured to receive a challenge 41 originated from a server 40 and to select the security rule depending on the challenge.

The OTP device may be configured to generate the One-Time-Password as the signature of the challenge 41 computed with a key preregistered in the OTP device. For instance the signature may be computed by using the RSA, the Digital Signature Algorithm (DSA), the ESIGN (Efficient digital SIGNature) or the Elliptic Curve Digital Signature Algorithm (ECDSA) algorithm. Algorithms based on symmetric keys or public-private keys pair may be used to generate the signature of the challenge 41.

The OTP device may be configured to send the One-Time-Password to a remote appliance.

The OTP device 20 may be bound to several biometric cards.

In some embodiments the OTP device may be adapted to automatically perform the sequence of actions presented at FIGS. 1, 2 and/or 3.

The biometric card 10 comprises a communication interface 12 adapted to exchange data in contact or contactless mode with the OTP device. For instance, the communication interface 12 may allow the card to communicate with the OTP device 20 through Bluetooth Low Energy® (known as BLE).

The biometric card 10 comprises a biometric sensor 18 and a secure element 14 configured to verify that a biometric data captured by the sensor matches with a preregistered reference value (reference template) stored in the card. The biometric sensor 18 may be designed to capture fingerprint data for instance. The biometric card 10 may comprise a controller 16 of the biometric sensor. Such a controller may be implemented as a MCU for instance.

The biometric card 10 comprises its own identifier 19. The biometric card 10 may comprise a key 15. The secure element may be configured to apply a preset cryptographic function to the identifier 19. The cryptographic function may require the use of the key 15 as input parameter.

In some embodiments, the card 10 may be a conventional biometric smartcard adapted to return the computed cryptographic value 72 only if the user has been successfully authenticated through a capture biometric data.

In some embodiments, the card 10 may be adapted to compute a cryptographic value 72 by applying the cryptographic function to the card identifier 19 upon receipt of a request 84 (to get a cryptographic value 72) devoid of card identifier and received from the OTP device 20.

The biometric card 10 may be bound to several OTP devices.

The biometric card 10 may store several biometric references assigned to as many different users.

In some embodiments, the communication channel established between the card and the OTP device may be a secure channel so as to guarantee confidentiality of exchanged data or to avoid replay attacks. The communication session may be secured by using one or several shared keys. The secure channel may rely on the secure messaging mechanism as defined by ISO/IEC7816 part 4.

Thanks to some embodiments of the invention, the provision of One-Time-passwords by the OTP device cannot be done without agreement of the genuine user of the card bound to the OTP device.

According to some embodiments of the invention, neither the OTP device nor the server hold the biometric data (captured data and reference template) which remain into the card. Thus privacy and security may be guaranteed to the user who wants to use the OTP device.

According to some embodiments of the invention, the OTP device does not need to be personalized (with credentials or biometric reference specific to the user) before being supplied to the user.

The invention is not limited to the described embodiments or examples. In particular, the described examples and embodiments may be combined.

In some embodiments, the OTP device may be replaced by an apparatus providing features different from One-Time-passwords (i.e. an apparatus that does not handle OTP.) In such a case, the binding phase may be carried out in a way similar to the sequence of FIG. 1 and the releasing of a new OTP (as describes at FIGS. 2 and 3) may be replaced by the provision of a service or a feature specific to the appliance. Such embodiments allow to protect access to a service or function provided by a hardware device. For instance, a toaster can start heating only if the user has been successfully authenticated through the biometric sensor of its associated card. For instance, the successful authentication of a user through biometric data captured by the card associated to a device may be a necessary condition to be fulfilled for a vehicle to start, a television to change the channel, a water cooler to deliver liquid, a drink dispenser to dispense a bottle or a glass, a printer to print, a lock to unlock, a safe to open, a door to open, a machine to load parameters, a screen to display data or a laptop to unlock.

The invention is not limited to Banking smart cards and applies to any biometric smart cards allocated to at least one user. For example, the smart card may be an access badge providing access to a physical building, room or a logical area.

Although examples of the invention has been detailed for a fingerprint sensor, it may apply to cards embedding any biometric sensor targeting various types of data: iris, voice, face, heartbeat, palm print or blood oxygen level (SpO2) for examples.

The invention claimed is:

1. A method for providing a One-Time-Password by an OTP apparatus that is a hardware apparatus, the method comprises the steps:

establishing a communication channel between the OTP apparatus and a smart card embedding a biometric sensor, said smart card being separate from the OTP apparatus and the OTP apparatus comprising a communication interface able to communicate with said smart card, sending through the communication channel, from the OTP apparatus to the smart card, a request to get a cryptographic value computed from an identifier of the smart card, in response to receiving the request, trying to authenticate a user by using said biometric sensor and automatically releasing the cryptographic value by the smart card only if the user was successfully authenticated by the smart card, the smart card generating the cryptographic value by applying a cryptographic function to the identifier of the smart card, sending said cryptographic value from the smart card to the OTP apparatus through the communication channel, performing by the OTP apparatus a verification of the cryptographic value by using a reference value pre-stored in a non-volatile memory of the OTP apparatus, and providing the One-Time-Password by the OTP apparatus only if said verification was successful.

2. The method according to claim 1, wherein the method comprises the following steps before sending the request to get the cryptographic value:

sending, from the OTP apparatus to the smart card, a command to get said identifier, receiving by the OTP apparatus the identifier sent by the smart card in response to said command.

3. The method according to claim 2, wherein the method comprises the step:

checking by the OTP apparatus that the identifier received in response to said command matches a preregistered identity data and sending the request to get the cryptographic value only in case of successful checking.

4. The method according to claim 1, wherein the method comprises the previously executed steps:

receiving by the OTP apparatus a challenge originated from a server, generating a result by assessing a security rule depending on the challenge and triggering the sending of the request only if said result reflects that provision of the One-Time-Password is conditioned by a biometric authentication of the user.

5. The method according to claim 1, wherein the method comprises the previously executed steps:

sending, from the OTP apparatus to the smart card, a binding request to get the reference value, trying to authenticate the user by using said biometric sensor and automatically sending the reference value by the smart card only if the user was successfully authenticated, storing the reference value by the OTP apparatus.

6. The method according to claim 1, wherein the identifier is a serial number of the smart card.

7. An One-Time-Password (OTP) apparatus that is a hardware apparatus, wherein the OTP apparatus comprises a communication interface configured to establish a communication channel and to exchange data with a smart card separate from the OTP apparatus, said smart card embedding a biometric sensor, in that the OTP apparatus generates a result by assessing a security rule and to trigger sending of a request through the communication channel to the smart card only if said result reflects that provision of a One-Time-Password is conditioned by a biometric authentication of a user by the smart card using said biometric sensor, said request aiming at getting a cryptographic value computed by the smart card by applying a cryptographic function to an identifier of the smart card, wherein the cryptographic value is automatically released by the smart card only if the user was successfully authenticated by the smart card, in that, upon receipt of said cryptographic value through the communication channel, the OTP apparatus performs a verification of the cryptographic value by using a reference value pre-stored in a non-volatile memory of the OTP apparatus, and in that the OTP apparatus provides the One-Time-Password only if said verification was successful.

8. The OTP apparatus according to claim 7, wherein the OTP device retrieves the identifier of the smart card by sending to the smart card a command to get the identifier of the smart card before sending the request to get the cryptographic value.

9. The OTP apparatus according to claim 8, wherein the OTP apparatus checks that the identifier received in response to said command matches a preregistered identity data and to send the request to get the cryptographic value only in case of successful checking.

10. The OTP apparatus according to claim 8, wherein the OTP apparatus checks that the identifier received in response to said command complies with a predefined rule and to send the request to get the cryptographic value only in case of successful checking.

11. The OTP apparatus according to claim 10, wherein the predefined rule specifies that the identifier belongs to a specific range, reflects a specific card type or comply with a specific format.

12. The OTP apparatus according to claim 7, wherein the OTP apparatus receives a challenge originated from a server, and wherein the security rule depends on the challenge.

13. The OTP apparatus according to claim 12, wherein the OTP device generates the One-Time-Password by signing the challenge with a key preregistered in the OTP apparatus.

14. The OTP apparatus according to claim 7, wherein the OTP apparatus displays the One-Time-Password or to send the One-Time-Password to a remote apparatus.

15. A system comprising a smart card, wherein the system comprises an OTP apparatus according to claim 7.

* * * * *